(12) United States Patent
Chen et al.

(10) Patent No.: US 8,745,653 B2
(45) Date of Patent: Jun. 3, 2014

(54) METHODS AND APPARATUS FOR AUTO-SUBSCRIPTION IN A NETWORK ENVIRONMENT

(75) Inventors: An Mei Chen, San Diego, CA (US); Gordon Kent Walker, Poway, CA (US); Sajith Balraj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 11/139,129

(22) Filed: May 27, 2005

(65) Prior Publication Data

US 2006/0253882 A1 Nov. 9, 2006

Related U.S. Application Data

(60) Provisional application No. 60/678,371, filed on May 5, 2005.

(51) Int. Cl.
*H04N 7/16* (2011.01)
*H04M 3/00* (2006.01)
*H04N 7/20* (2006.01)

(52) U.S. Cl.
USPC ............... 725/25; 725/38; 725/62; 725/86; 725/61; 455/418

(58) Field of Classification Search
USPC ................... 725/60, 61, 86, 104, 62
See application file for complete search history.

(56) References Cited

U.S. PATENT DOCUMENTS

| 6,494,762 B1 | 12/2002 | Bushmitch et al. |
| 6,529,727 B1 * | 3/2003 | Findikli et al. ............... 455/411 |
| 6,622,017 B1 | 9/2003 | Hoffman |
| 2002/0002368 A1 | 1/2002 | Tomita et al. |
| 2002/0023268 A1 * | 2/2002 | LaRocca et al. ............... 725/87 |
| 2003/0065738 A1 | 4/2003 | Yang et al. |
| 2004/0043763 A1 | 3/2004 | Minear et al. |
| 2004/0181591 A1 | 9/2004 | Yu et al. |
| 2005/0090235 A1 * | 4/2005 | Vermola et al. ............ 455/414.3 |
| 2006/0014535 A1 * | 1/2006 | Walker et al. ................. 455/433 |
| 2006/0293036 A1 * | 12/2006 | Zhou ............................ 455/415 |

FOREIGN PATENT DOCUMENTS

| EP | 0 820 207 A2 | 1/1998 |
| EP | 1 345 456 A2 | 9/2003 |
| JP | 2002163258 | 6/2002 |
| JP | 2003256305 A | 9/2003 |

OTHER PUBLICATIONS

International Search Report and Written Opinion of the International Searching Authority, PCT/US2006/017297, Aug. 21, 2006, European Patent Office, Munich, Germany.

* cited by examiner

*Primary Examiner* — Jun Fei Zhong (74) *Attorney, Agent, or Firm* — The Marbury Law Group, PLLC (57) ABSTRACT

Methods and apparatus for auto-subscription in a network environment. A method is provided that includes determining an affiliate associated with a device, and identifying a package associated with the affiliate. The method also includes generating system information parameters that identify the package, and transmitting the system information parameters to the device. The method also includes receiving a subscription request from the device, wherein the subscription request requests that the device be automatically subscribed to receive the package.

36 Claims, 7 Drawing Sheets

| FIELD | TYPE | SIZE (BYTES) |
|---|---|---|
| SYSTEM INFORMATION HEADER | MANDATORY | VARIABLE |
| Package_ID | MANDATORY | 4 |
| Package_Attribute | MANDATORY | 1 |
| Package_Name | MANDATORY | 20 |
| Package_Description | MANDATORY | 40 |
| Package_Price_Display | MANDATORY | 10 |
| Package_Price-Currency | MANDATORY | 4 |
| Package_Price | MANDATORY | 4 |
| Num_Tiers | MANDATORY | 1 |
| Tier_ID | MANDATORY | 4 |
| Root_Package | OPTIONAL | 2 |
| Num_Package_Refs | OPTIONAL | 1 |
| Package_Reference | OPTIONAL | 2 |

| 7 | 6 | 5 | 4 | 3 | 2 | 1 | 0 |
|---|---|---|---|---|---|---|---|
| RES | RES | RES | RES | BRANCH | ROOT | Ala_Cart | Auto_subscribe |

| FIELD | TYPE | SIZE (BYTES) |
|---|---|---|
| 502 — SYSTEM INFORMATION HEADER | MANDATORY | VARIABLE |
| 504 — Service Retailer_ID | MANDATORY | 4 |
| 506 — Service_Retailer_Name | MANDATORY | 1 |
| 508 — Num_Packages | MANDATORY | 20 |
| 510 { 512 — Package_ID | MANDATORY | 40 |
| 514 — Num_Auto_Subscribed_Packages | MANDATORY | 10 |
| 516 — Package_ID | MANDATORY | 4 |

| FIELD | TYPE | SIZE (BYTES) |
|---|---|---|
| 602 — SYSTEM INFORMATION HEADER | MANDATORY | VARIABLE |
| 604 — Service Retailer_ID | MANDATORY | 4 |
| 606 — Num_Service | MANDATORY | 1 |
| 608 { 610 — Service_ID | MANDATORY | 20 |
| 612 — Service_Attribute | MANDATORY | 40 |

| 7 | 6 | 5 | 4 | 3 | 2 | 1 | 0 |
|---|---|---|---|---|---|---|---|
| RES | | | INVISIBLE SERVICE | BARKER DISABLED SERVICE | NON EXCLUDABLE SERVICE | 1XEVDO SERVICE | 1X SERVICE |

METHODS AND APPARATUS FOR AUTO-SUBSCRIPTION IN A NETWORK ENVIRONMENT

FIELD

The present Application for Patent claims priority to Provisional Application No. 60/678,371 entitled METHODS AND APPARATUS FOR AUTO-SUBSCRIPTION IN A NETWORK ENVIRONMENT filed May 5, 2005, and assigned to the assignee hereof and hereby expressly incorporated by reference herein.

The present invention relates generally to the distribution of content in a network environment, and more particularly, to methods and apparatus for auto-subscription in a network environment.

BACKGROUND

Data networks, such as wireless communication networks, have to trade off between services customized for a single device and services designed to be provided to a large number of devices. The distribution of content (data) to a large number of devices (subscribers) is a complicated problem. For example, the types of content currently available include real-time and multimedia content, such as news, financial information and movies.

In a subscription media system, devices are subscribed to receive content in the form of packaged services. For example, a variety of news services maybe combined to form a news package that a device may subscribe to receive. However, it is also desirable to deliver selected content to an otherwise unsubscribed device. For example, it is desirable to deliver content, such as news trailers, relevant advertisements, promotional content, music, videos, or any other type of content that may be of interest to the device user. Unfortunately, the delivery of unsubscribed content is generally not supported in conventional systems, and most particularly, in wireless communication systems. In most cases, contact with a customer service representative is usually required to obtain any type of subscription.

Another aspect of content delivery concerns the role of "affiliates." An affiliate is an entity that is associated with a device to provide selected content or services. For example, one type of affiliate is a billing and customer service provider that operates to provide billing and customer services to a device. Another type of affiliate is a content retailer that operates to provide selected content to a device. Affiliates may be associated with a device based on contract, subsidy provisions, or any other type of arrangement. For example, the user of a device may agree to receive specific advertisements or other content offered by a Billing and customer service provider or content retailer.

However, conventional systems typically do not support the delivery of content to an unsubscribe device, and there is no mechanism to control content delivery from a particular affiliate. For example, typical systems do not automatically subscribe a device to receive selected content from a particular affiliate.

Therefore, what is needed is a subscription system for use in network environments that operates to automatically subscribe a device to receive selected content, such as selected advertisements, and/or promotional content. The system should also operate to automatically subscribe a device to receive selected content and/or services from particular device affiliates.

SUMMARY

In one or more embodiments, an auto-subscription system, comprising methods and apparatus, is provided that operates to automatically subscribe a device to receive selected content and/or services in a data network. For example, the device may be a mobile device in a wireless communication network, and the system operates to automatically subscribe the device to receive selected advertisements, media clips, promotional material, or other types of content without requiring specific involvement by the device user.

In one embodiment, a device goes through an activation process with a content distribution server to allow the device to subscribe to receive content in the system. As a result of the activation process, system information is transmitted to the device. The system information identifies content and/or services that are to be automatically subscribed to the device. The system information is processed at the device to generate an auto-subscription request that is transparently transmitted back to the content distribution server. The subscription request identifies the device and any content and/or services that are to be automatically subscribed to the device. The content distribution system then automatically subscribes the device to receive the requested content or service. In one embodiment, the content distribution system provides the content or service, and in another embodiment, a third party is authorized to provide them. The content or service is then provided to the device for rendering and/or execution.

In one embodiment, the system information is generated to allow the device to be automatically subscribed to receive content or services from one or more particular affiliates. For example, the system allows content from billing and customer service providers, content retailers, service providers and other affiliates to be automatically subscribed to a device. Thus, the system is especially well suited for use in wireless networks where it is desirable to provide automatic subscriptions to selected content without requiring user interactions.

In one embodiment, a method is provided for operating a server in an automatic subscription system. The method comprises determining an affiliate associated with a device, and identifying a package associated with the affiliate. The method also comprises generating system information parameters that identifies the package, and transmitting the system information parameters to the device. The method also comprises receiving a subscription request from the device, wherein the subscription request requests that the device be automatically subscribed to receive the package.

In one embodiment, apparatus is provided for automatic subscriptions in a data network. The apparatus comprises logic that operates to determine an affiliate associated with a device, and logic that operates to identify a package associated with the affiliate. The apparatus also comprises logic that operates to generate system information parameters that identifies the package, and logic that operates to transmitting the system information parameters to the device. The apparatus also comprises logic that operates to receive a subscription request from the device, wherein the subscription request requests that the device be automatically subscribed to receive the package.

In one embodiment, apparatus is provided for automatic subscriptions in a data network. The apparatus comprises means for determining an affiliate associated with a device, and means for identifying a package associated with the affiliate. The apparatus also comprises means for generating system information parameters that identifies the package, and means for transmitting the system information parameters to the device. The apparatus also comprises means for receiving a subscription request from the device, wherein the subscription request requests that the device be automatically subscribed to receive the package.

In one embodiment, a computer-readable media is provided that comprises means, which when executed by processing logic in a server, operate to provide automatic subscriptions in a data network. The computer-readable media comprises means for determining an affiliate associated with a device, and means for identifying a package associated with the affiliate. The computer-readable media also comprises means for generating system information parameters that identifies the package, and means for transmitting the system information parameters to the device. The computer-readable media also comprises means for receiving a subscription request from the device, wherein the subscription request requests that the device be automatically subscribed to receive the package.

In one embodiment, a method is provided for operating a device in an automatic subscription system. The method comprises activating the device with a server on a data network, and receiving system information parameters that identify a package. The method also comprises processing the system information to generate an automatic subscription request, and transmitting the automatic subscription request to the server, wherein the automatic subscription request requests that the device be automatically subscribed to receive the package.

In one embodiment, apparatus is provided for operating a device in an automatic subscription system. The apparatus comprises logic that operates to activate the device with a server on a data network, and logic that operates to receive system information parameters that identifies a package. The apparatus also comprises logic that operates to process the system information to generate an automatic subscription request, and logic that operates to transmit the automatic subscription request to the server, wherein the automatic subscription request requests that the device be automatically subscribed to receive the package.

In one embodiment, apparatus is provided for operating a device in an automatic subscription system. The apparatus comprises means for activating the device with a server on a data network, and means for receiving system information parameters that identify a package. The apparatus also comprises means for processing the system information to generate an automatic subscription request, and means for transmitting the automatic subscription request to the server, wherein the automatic subscription request requests that the device be automatically subscribed to receive the package.

In one embodiment, a computer-readable media is provided comprising means, which when executed by processing logic in a device, operate to provide automatic subscriptions in a data network. The computer-readable media comprises means for activating the device with a server on a data network, and means for receiving system information parameters that identify a package. The computer-readable media also comprises means for processing the system information to generate an automatic subscription request, and means for transmitting the automatic subscription request to the server, wherein the automatic subscription request requests that the device be automatically subscribed to receive the package.

Other aspects, advantages, and features of the present invention will become apparent after review of the hereinafter set forth Brief Description of the Drawings, Detailed Description, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes one or more embodiments of an automatic subscription system that operates to automatically subscribe a device on a data network to receive selected content, such as advertisements, promotional content, or any other type of content, or program. The system also operates to allow a device to be automatically subscribed to received content and/or services from particular device affiliates. The system is especially well suited for use in wireless network environments, but may be used in any type of network environment, including but not limited to, communication networks, public networks, such as the Internet, private networks, such as virtual private networks (VPN), local area networks, wide area networks, long haul network, or any other type of data network.

For the purpose of this description, the following terms are used to describe one or more embodiments of an automatic subscription system.

Auto Subscribe Package An auto-subscribe package is a package that will automatically subscribe a device to receive selected content.

Service A service is a sequence of media presentations and represents the smallest element in the system to which a device may be subscribed.

Tier A tier is a collection of services.

Package A package (or "service package") is a collection of tiers that are offered on a subscription basis.

Exclusion The act of exclusion suppresses the delivery of a subscribed service.

Invisible Service An invisible service is a service that is not displayed on a device display and hence is invisible to the device user.

Figure 1:
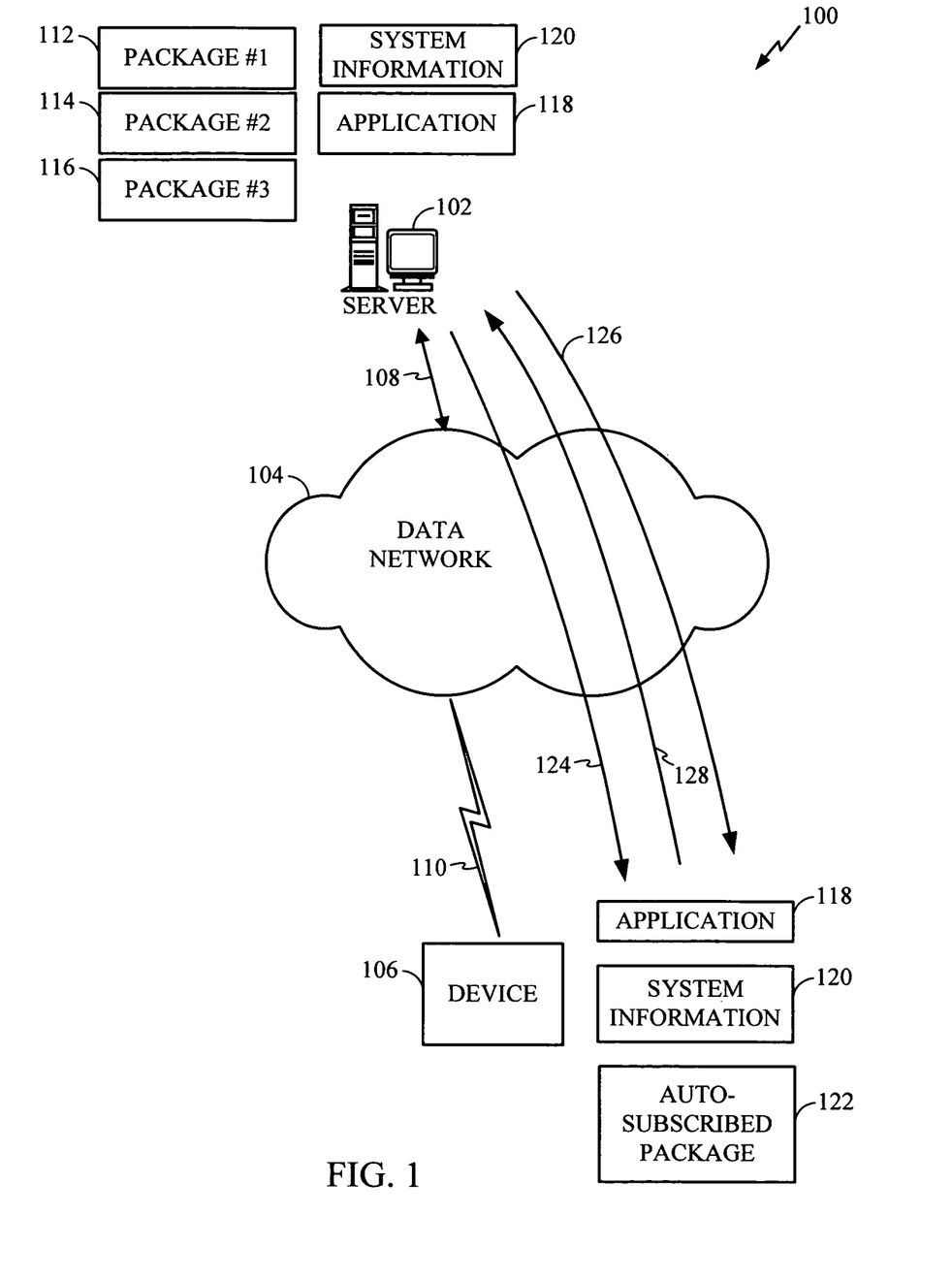
FIG. 1 shows a data network that comprises one embodiment of an automatic subscription system.

FIG. 1 shows a network 100 that comprises one embodiment of an automatic subscription system that operates to automatically subscribe a device to receive advertisements, promotional content, programs, data, services, and/or any other type of information. The network 100 comprises server 102, data network 104, and device 106. The data network 104 may be any type and/or combination of wired and wireless networks that allow data to be transmitted between the server 102 and the device 106. The server 102 is coupled to the network 104 via the communication link 108, which may be any type of wired and/or wireless communication link that allows the server 102 to communicate over the data network 104. The device 106 comprises a mobile telephone, PDA, notebook computer, pager, email device, or any other type of device that may operate on a network to subscribe to receive content. The device 106 is in communication with the data network 104 via wireless communication link 110, which allows data to be wirelessly transmitted between the network 104 and the device 106. In one embodiment, the wireless communication link 110 comprises forward communication channels, reverse communication channels, control channels, and any other type of communication channel that may be used to communicate information between the network 104 and the device 110. It should also be noted that although only one device is shown in FIG. 1, one or more embodiments of the system are suitable for use with virtually any number of devices that communicate with the network 104 via wired and/or wireless communication links.

For the purpose of this description, it will be assumed that the server 102 includes three packages (112, 114 and 116). For example, the packages (112, 114 and 116) comprise any type of advertisement, promotional content, data file, multimedia file, programs, and/or any other type of content or information. Thus, the system operates to automatically subscribe the device 106 to receive one or more of the packages (112, 114 and 116) via the network 104.

In one embodiment, the device is affiliated with one or more billing and customer service providers, content retailers, service providers, or content providers, which in turn, have provided or are associated with one or more of the packages (112, 114 and 116). In one embodiment, the system operates to discover the affiliations and automatically subscribe the device to receive content and/or services associated with those entities.

In one embodiment, an activation process is performed wherein a device is activated with the system so that the device may subscribe to receive content. For example, during the activation process, the device 106 provides information to the server 102 that identifies the device 106 and provides authentication, authorization, and/or any other suitable information to allow the device to be activated in the system. In response, the server 102 transmits an application 118 and system information 120 to the device, as shown by path 124. For example, the application 118 may be a single program, script, executable, or a collection of programs that run on the device. In one embodiment the application 118 comprises a subscription manager that operates to automatically subscribe the device to receive selected content.

In one embodiment, the system generates the system information 120 to comprise one or more records that are used to automatically subscribe content and/or services to the device 106. For example, in one embodiment, the system information 120 comprises package records that identify packages that are to be automatically subscribed to the device. In another embodiment, the system information comprises service retail records that also describe packages to be automatically subscribed to the device. Thus, the system information comprises any suitable record type or information that can be used to identify packages or services that are to be automatically subscribed to the device 106.

In one embodiment, the system information is constructed to include records that operate to automatically subscribe the device to packages that are provided by an affiliate, such as a billing and customer service provider, service retailer, service provider, or content provider. Thus, the system operates to allow entities affiliated with the device to provide content and/or services that are automatically subscribed to the device.

In one embodiment, application 118 comprises a subscription manager that processes the records included in the system information 120 to generate an automatic subscription request that is transparently transmitted back to the server 102 from the device 106, as shown by path 128. For example, the automatic subscription request provides information to the server 102 about the device 106 and the content to which the device wishes to automatically subscribe. For example, the information contained in the subscription request may include a device identifier, a network address, device configuration information, content/service identifiers, user preferences, and/or any other relevant information. Thus, the subscription request is used to transparently transmit any type of information about the device 106 and the desired packages to the server 102.

In one embodiment, the server 102 uses the information received in the automatic subscription request to determine one or more of the packages (112, 114, 116) to automatically subscribe to the device 106. The server 102 transmits the subscribed package to the device 112 via the data network 108, as shown by path 126. The automatically subscribed package is then rendered on the device 106, and/or provides some other service or function to the device that may be invisible (i.e., an invisible service) to the device user. As a result, the system operates to automatically subscribe the device 106 to receive advertising, promotional content, and/or other content that is identified in the subscription request Thus, in one or more embodiments, an automatic subscription system is provided that operates to automatically subscribe one or more devices to receive selected content and/or services. The system also provides automatic subscriptions to selected content that is associated with one or more particular device affiliates, such as billing and customer service providers, service retailers, or content providers. As a result, embodiments of the automatic subscription system provide a way for devices to be automatically subscribed to receive selected content in an efficient manner without requiring specific user interactions with customer service representative.

Figure 2:
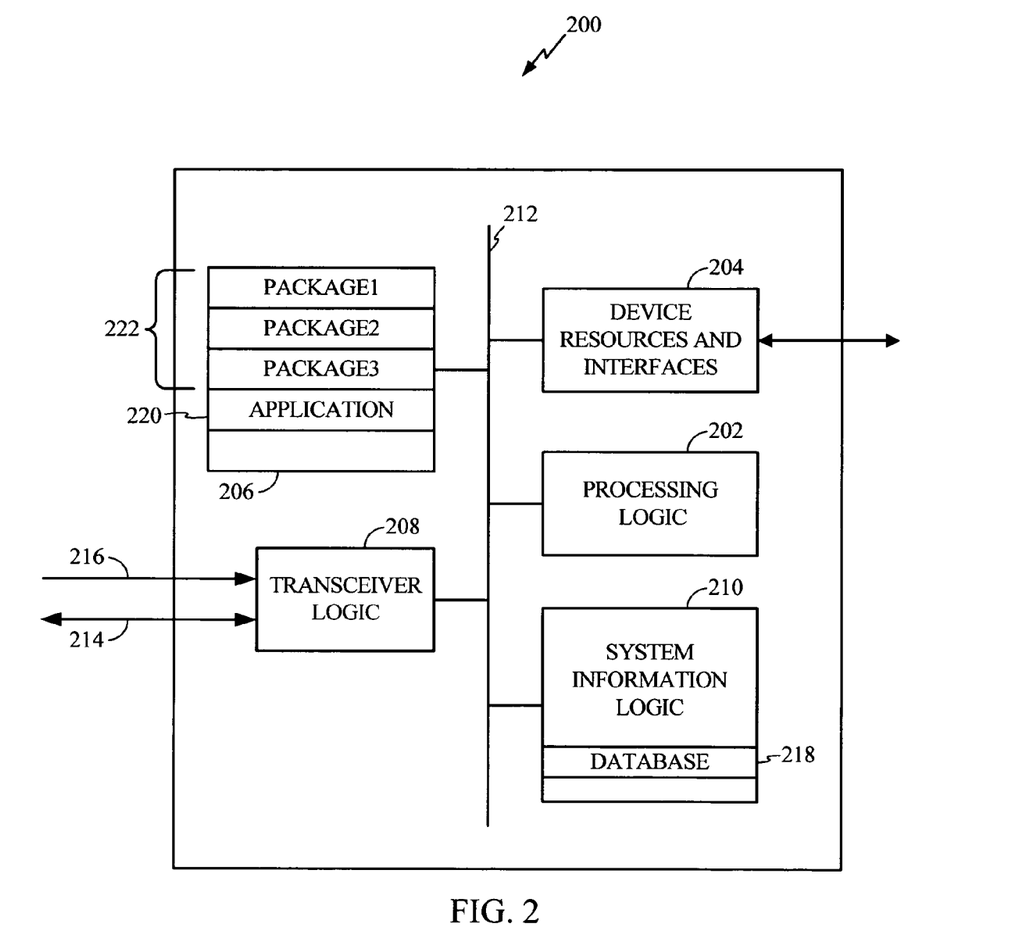
FIG. 2 shows a detailed diagram of one embodiment of a server suitable for use in one embodiment of an automatic subscription system.

FIG. 2 shows a detailed diagram of one embodiment of a server 200 suitable for use in one embodiment of an automatic subscription system. For example, the server 200 may be the server 102 in FIG. 1. The server 200 comprises processing logic 202, device resources 204, memory 206, transmitting logic 208, and system information logic 210, all coupled to an internal data bus 212.

In one or more embodiments, the processing logic 202 comprises a CPU, processor, gate array, hardware logic, memory elements, software executing on a processor (including virtual machines), and/or any combination of hardware and software. Thus, the processing logic 202 generally comprises logic to execute machine-readable instructions and to control one or more other functional elements of the server 200 via the internal data bus 212.

In one embodiment, the processing logic 202 operates to activate a device to allow the device to subscribe to receive content. During the activation process, the device provides identification, authentication, and/or other information to the server. The processing logic 202 stores the device information in the memory 206 for later processing.

The device resources and interfaces 204 comprise hardware and/or software executing on a processor that allow the server 200 to communicate with internal and external systems. For example, internal systems may include mass storage systems, memory, display driver, modem, or other internal device resources. The external systems may include user interface devices, printers, disk drives, or other local devices or systems.

The data memory 206 comprises any type of memory device suitable for storing data files, content, applications or any other type of information. The memory 206 includes content to be automatically subscribed to one or more devices on a data network. For example, the memory 206 comprises content packages 222, which are content packages that may be automatically subscribed to a device communicating on a network. For example, the content packages 222 may comprise the content 112, 114, or 116 shown in FIG. 1. The memory 206 also comprises an application 220, which in one embodiment includes a program guide and a subscription manager that are downloaded to a device during an activation process. For example, in one embodiment, the program guide executes on the device to display service packages available for subscription, and the subscription manager executes on the device to automatically generate subscription requests.

The transmitting logic 208 comprises hardware and/or software executing on a processor that operates to allow the server 200 to transmit data or other information to remote devices or systems. For example, in one embodiment, the transmitting logic 208 comprises a transceiver channel 214 that operates to transmit and receive information over a data network to/from remote devices, such as mobile devices. In one embodiment, the transmitting logic 208 also comprises a receive channel 216 that operates to receive transparent communications from one or more devices. In one embodiment, the receive channel 216 is part of the transceiver channel 214.

The system information logic 210 comprises a CPU, processor, gate array, hardware logic, memory elements, software, executing on a processor (including virtual machines), and/or any combination of hardware and software. The system information logic 210 operates to generate system information that is transmitted to a device during the activation process. In one embodiment, the system information comprises package records that identify packages to which the device will be automatically subscribed.

In one embodiment, the system information logic 210 uses the identification information provided by the device to process the database 218 to assemble package records that are included in the system information. For example, in one embodiment, the system information logic 210 uses the database 218 to determine if a particular device is associated or affiliated with one or more selected billing and customer service providers, service retailers, or content providers. If the device is associated or affiliated with a particular content retailer or service provider, then the system information logic 210 generates package records in the system information that will cause content packages provided by those retailers or providers to be automatically subscribed to by the device. It is also possible for the system information logic 210 to include package records in the system information for default content or any other content or service to be automatically subscribed to by the device. In still another embodiment, the device identification information is processed by the database 218 to determine selected content that will not be offered to the device for automatic subscription. For example, if the identification information shows that the device is not affiliated with a selected content retailer, then package records for content associated with that retailer will not be generated. As a result, that content will not be automatically subscribed to the device. Thus, the system provides a way to exclude, prohibit, or prevent a package from being offered to a particular device.

In one embodiment, the automatic subscription system comprises program instructions stored on a computer-readable media, which when executed by the processing logic 202, provides the functions of the server 200 described herein. For example, instructions may be loaded into the server 200 from a computer-readable media, such as a floppy disk, CDROM, memory card, FLASH memory device, RAM, ROM, or any other type of memory device or computer-readable media that interfaces to the server 200 via the device resources 204. In another embodiment, the instructions may be downloaded into the server 200 from a network resource that interfaces to the sever 200 via the transceiver logic 208. The instructions, when executed by the processing logic 202, provide one or more embodiments of an automatic subscription system described herein.

Figure 3:
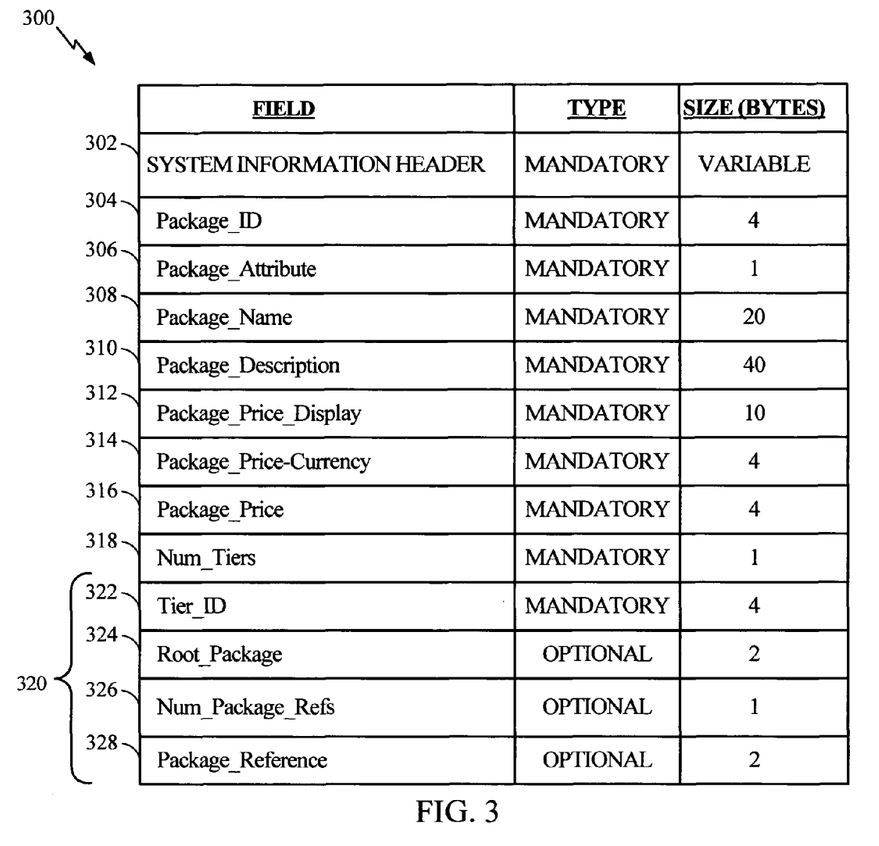
FIG. 3 shows one embodiment of a package record for use in one embodiment of an automatic subscription system.

FIG. 3 shows one embodiment of a package record 300 for use in one or more embodiments of an automatic subscription system. For example, in one embodiment, the package record 300 is generated by the automatic subscription logic 210 and included in system information that is transmitted from the server 200 to a device. It should be noted that the package record 300 is just one embodiment and that other record configurations having more or less information is within the scope of the embodiments.

The package record 300 comprises a listing of fields, field types, and field sizes. For example, the fields comprise a system information header 302, package identifier 304, package attributes 306, package name 308, package description 310, package price display 312, package price currency 314, and package price 316.

The package record 300 also comprises a number of tiers 318 that is followed by a corresponding number of tier identifiers 320. For example, the tier identifiers include a tier identity 322, root package parameter 324, and number of package references 326 that are following by a corresponding number of package references 328. In one embodiment, the package attribute 306 is used to indicate that the identified package is to be automatically subscribed to the device.

Figure 4:
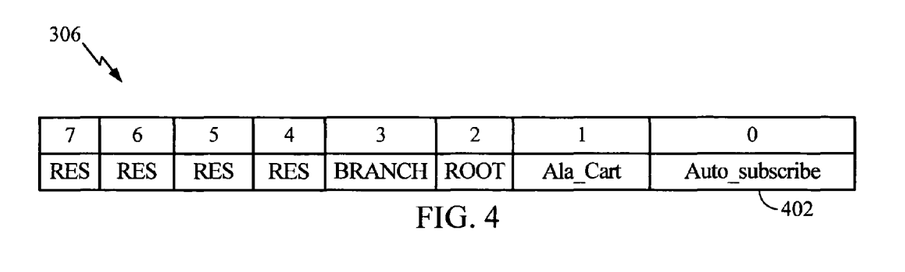
FIG. 4 shows one embodiment of a package attribute field for use in one embodiment of the package record of FIG. 3.

FIG. 4 shows one embodiment of the package attribute 306 for use in one embodiment of the package record 300 of FIG. 3. The package attribute 306 comprises eight bits where bit zero indicates whether the corresponding package is to be automatically subscribed to the device. For example, if bit zero is a "one", then the package identified by the package identifier 304 is to be automatically subscribed to the device.

Figure 5:
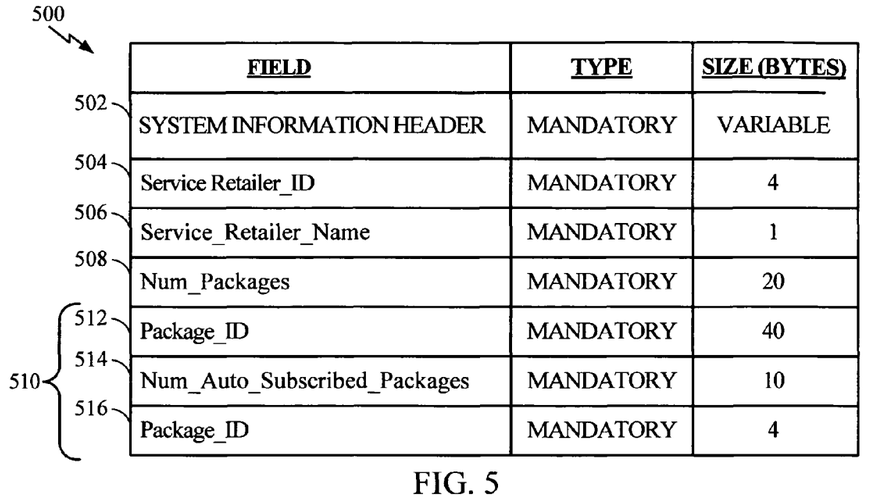
FIG. 5 shows one embodiment of a content retailer record for use in one embodiment of an automatic subscription system.

FIG. 5 shows one embodiment of a content retailer record 500 for use in one embodiment of an automatic subscription system. For example, the content retailer record 500 is used to allow a device to automatically subscribe to receive selected content from a selected content retailer.

The content retail record 500 comprises a listing of fields and associated field types, and field sizes. The fields comprise a system information header 502, content retailer identifier 504, content retailer name 506, and a number of packages parameter 508 that is followed by a corresponding number of package information 510.

The package information 510 comprises package identifier 512 and a number of auto-subscribed packages parameter 514 followed by a corresponding number of package identifiers 516. In one or more embodiments, the package information 510 directly identifies packages that are to be automatically subscribed by the device.

Figure 6:
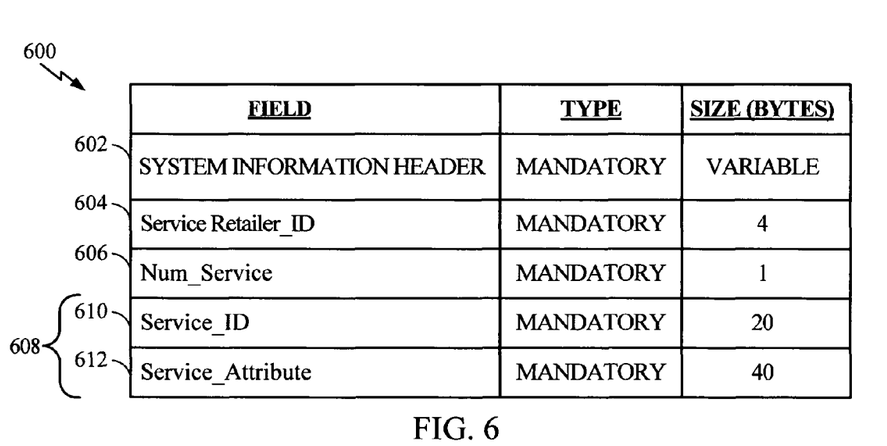
FIG. 6 shows one embodiment of extended content retailer record for use in one embodiment of an automatic subscription system.

FIG. 6 shows one embodiment of extended content retailer record 600 for use in one embodiment of an automatic subscription system. The extended content retailer record 600 is incorporated into system information that is transmitted to a device and provides information that allows a device to automatically subscribe to selected content.

The extended content retailer record 600 comprises a system information header 602, content retailer identifier 604, number of services 606 followed by a corresponding number of service information parameters 608 that comprises a content identifier 610 and content attribute 612. In one embodiment, a subscription manager executing on the device parses the extended content retailer record 600 to determine content that is to be automatically subscribed to the device.

Figure 7:
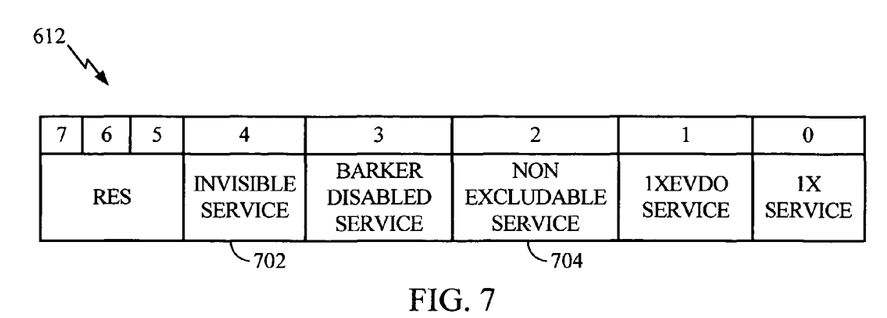
FIG. 7 shows one embodiment of a service attribute field for use in one embodiment of the extended content retailer record shown in FIG. 6.

FIG. 7 shows one embodiment of the content attribute field 612 for use in one embodiment of the extended content retailer record shown in FIG. 6. The content attribute field 612 identifies attributes associated with selected content. For example, the content attribute field 612 comprises eight bits that allow specific content attributes to be specified. In one embodiment, bit "4" (shown at 702) indicates whether the content provides an invisible service. For example, the service runs on the device without displaying any information and is therefore invisible to the device user. Bit "2" (shown at 704) indicates whether or not the content can be excluded from the device. Thus, the content retailer record 500 allows for content to be automatically subscribed to a device, and the extended content retailer record 600 provides additional attributes for selected services. In one or more embodiments, a subscription manager or other application executing at the device parses the content retailer records 500, 600 to generate an automatic subscription request and configure the automatically subscribed services.

Figure 8:
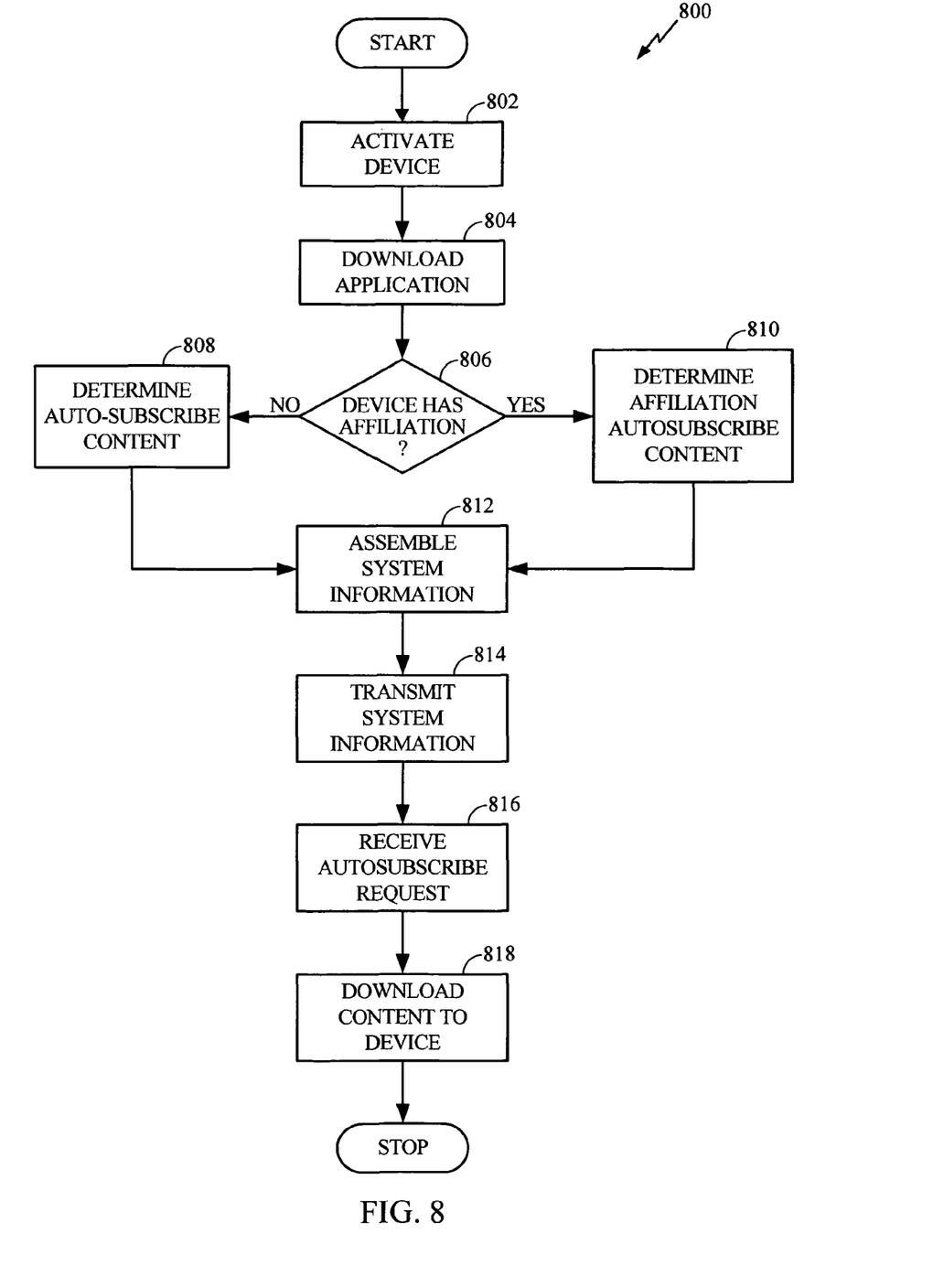
FIG. 8 shows one embodiment of a method for operating a server in one embodiment of an automatic subscription system.

FIG. 8 shows one embodiment of a method 800 for operating a server in one embodiment of an automatic subscription system. For clarity, the method 800 will be described with reference to the server 200 shown in FIG. 2. In one or more embodiments, the processing logic 202 executes program instructions to control the server to perform the functions described below.

At block 802, a device activates with the automatic subscription system. For example, the device 106 provides information to the server 102 to allow the server 102 to authenticate the device 106 and authorize the device 106 to subscribe to available content.

At block 804, as part of the activation process, an application is downloaded to the device via the data network. In one embodiment, the processing logic 202 retrieves the application 220 from the memory 206 and transmits the application 220 to the device via the transceiver logic 208. The application comprises a program guide that includes a subscription manager that executes on the device and operates to automatically subscribe to the device to receive selected content.

At block 806, a test is performed to determine if the device has any affiliations with entities that have provided content or services to be automatically subscribed to the device. For example, the test determines if the device has an affiliation with a billing and customer service provider, content retailer, or other provider. For example, the system information logic 210 uses the information provided by the device during the activation process to access the database 218 to determine any affiliations that may exist. If any affiliations exist, the method proceeds to block 810. If no affiliations exist, the method proceeds to block 808.

At block 808, a determination is made to determine any packages that may be automatically subscribed to the device when no affiliations exist. For example, the system information logic 210 operates to determine which if any packages are to be automatically subscribed to the device even though no affiliations exist. In this case, default content or services may be automatically subscribed to the device.

At block 810, a determination is made to determine any packages that may be automatically subscribed to the device when affiliations exist. For example, the system information logic 210 operates to determine which if any packages are to be automatically subscribed to the device when one or more device affiliates exist. For example, the device may have affiliates such as billing and customer service providers, or content retailers. In one embodiment, the system information logic 210 processed the database to identify content that is associated with each affiliate.

At block 812, system information is assembled for transmission to the device. For example, the system information includes one or more package records and/or content records that identify content or services determined at blocks 808 and 810. In one embodiment, the system information logic 210 generates the system information for transmission to the device. For example, the package and content records included in the system information may be formatted as shown in FIG. 3 through FIG. 7.

At block 814, the system information is transmitted to the device. For example, the system information logic 210 transmits the system information to the device via the transceiver logic 208.

At block 816, the server receives an automatic subscription request from the device. In one embodiment, when the subscription manager executes on the device and operates to generates the automatic subscription request based on the records in the system information. The automatic subscription request is transparently transmitted back to the server via a network link. Thus, the subscription request is generated without the device user making a specific request for a subscription to the server.

At block 818, the packages identified in the automatic subscription request are automatically subscribed to the device. In one embodiment, the packages are downloaded to the device from the server. For example the processing logic 202 operates to retrieve the packages from the memory 206 and control the transceiver logic 208 to transmit the packages to the device. In another embodiment, the server operates to authorize an affiliate or third party to transmit the packages to the device.

It should be noted that the method 800 illustrates just one embodiment and that changes, additions, or rearrangements of the functional elements may be made without deviating from the scope of the described embodiments.

Figure 9:
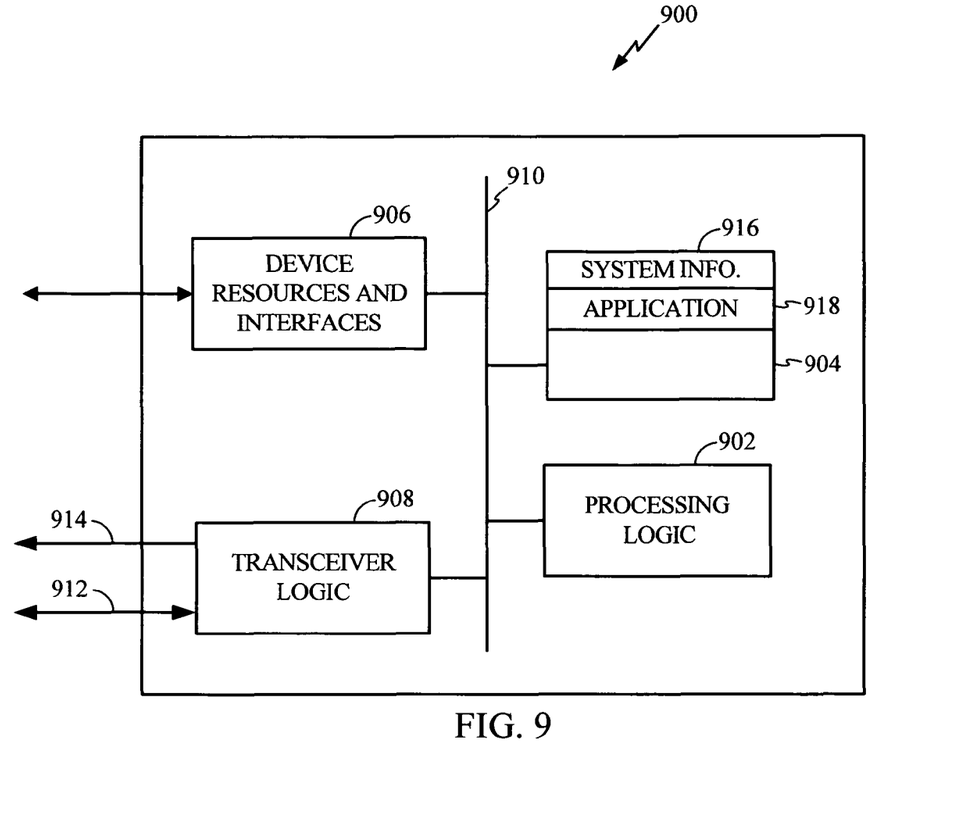
FIG. 9 shows a detailed diagram of one embodiment of a device suitable for use in one embodiment of an automatic subscription system.

FIG. 9 shows a detailed diagram of one embodiment of a device 900 suitable for use in one embodiment of an automatic subscription system. For example, the device 900 is suitable for use as the device 106 in FIG. 1. The device 900 comprises processing logic 902, memory 904, device resources and interfaces 906, and transceiver logic 908, all coupled to a data bus 910.

In one or more embodiments, the processing logic 902 comprises a CPU, processor, gate array, hardware logic, memory elements, software executing on a processor (including virtual machines), and/or any combination of hardware and software. Thus, the processing logic 902 generally comprises logic to execute machine-readable instructions and to control one or more other functional elements of the device 900 via the internal data bus 910.

The device resources and interfaces 906 comprise hardware and/or software executing on a processor that allow the device 900 to communicate with internal and external systems. For example, internal systems may include mass storage systems, memory, display driver, modem, or other internal device resources. The external systems may include user interface devices, printers, disk drives, or other local devices or systems.

The transceiver logic 908 comprises hardware and/or software executing on a processor that operates to allow the device 900 to transmit and receive data and other information with external devices or systems. For example, the transceiver logic 908 comprises a communication link 912 that allows the transceiver logic 908 to transmit and receive data and/or other information over a data network. In one embodiment, the transceiver logic 908 also comprises a transparent communication link 914 that may be used to transparently transmit an automatic subscription request to a server on a network. In one embodiment, the link 914 is part of the communication link 912. Thus, the device 900 is able to communicate with other network entities, such as a server. For example, the processing logic 902 may use the transceiver logic 908 to transmit an automatic subscription request to a network server via the link 914.

The memory 904 comprises any type of memory suitable for storing information at the device 900. For example, the device 900 may receive an application 918 in a transmission from a server. In one embodiment, the processing logic 902 operates to store the application program in the memory 904 until execution time. The memory 906 may also be used to store program variables or other information. In another embodiment, the application 918 may be stored in the memory 906 during device manufacture, or the application 918 may be loaded into the device 900 from a local system via the device resources and interfaces 906. In one embodiment, the application comprises a subscription manager that operates to automatically subscribe the device to receive one or more services.

During operation, the device 900 operates according to one or more embodiments of an automatic subscription system to automatically subscribe to otherwise unsubscribed content. In one embodiment, the application 918 and the system information 916 are transmitted to the device during an activation process. The application 918 comprises a subscription manager that processes the system information 916 to generate an automatic subscription request that is transmitted to a content distribution server. The content identified in the subscription request is then automatically subscribed to the device. The content is then downloaded to the device 900 from the content distribution server or an authorized third party.

In one embodiment, the automatic subscription system comprises program instructions stored on a computer-readable media, which when executed by the processing logic 902, provides the functions of the device 900 described herein. For example, instructions may be loaded into the device 900 from a computer-readable media, such as a floppy disk, CDROM, memory card, FLASH memory device, RAM, ROM, or any other type of memory device or computer-readable media that interfaces to the device 900 via the device resources 906. In another embodiment, the instructions may be downloaded into the device 900 from a network resource that interfaces to the device 900 via the transceiver logic 908. The instructions, when executed by the processing logic 902, provide one or more embodiments of an automatic subscription system as described herein.

Figure 10:
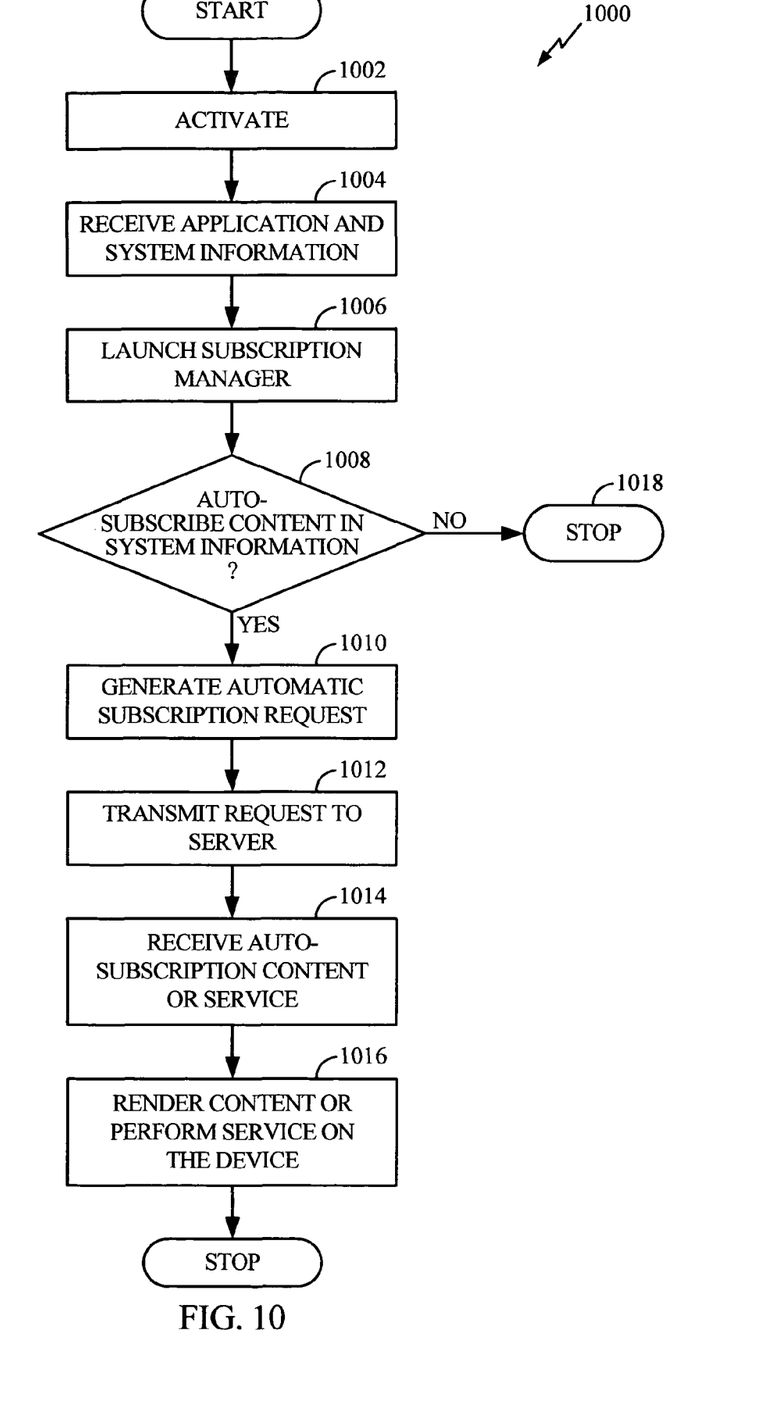
FIG. 10 shows one embodiment of a method for operating a device in one embodiment of an automatic subscription system.

FIG. 10 shows one embodiment of a method 1000 for operating a device in one embodiment of an automatic subscription system. For clarity, the method 1000 will be described with reference to the device 900 shown in FIG. 9. In one or more embodiments, the processing logic 902 executes program instructions to control the device 900 to perform the functions described below.

At block 1002, the device activates with the subscription system so that it may subscribe to receive content. For example, in one embodiment, the processing logic 902 transmits device information (via the transceiver logic 908) to a content distribution server to activate with the system.

At block 1004, in response to the activation process, the device receives an application and system information. For example, the application comprises a program guide and a subscription manager. In one embodiment, the application and system information are stored in the memory 904.

At block 1006, the application is launched and executed. For example, the processing logic 902 retrieves the application 918 from the memory 904 and begins its execution. In one embodiment, the application 918 comprises a subscription manager that operates to process the system information 916 to determine if any content or service needs to be automatically subscribed.

At block 1006, a test is performed to determine if any content or service needs to be automatically subscribed. For example, the subscription manager processes the system information 916 to determine if any records are present that identify any content or service to be automatically subscribed. In one embodiment, the system information 916 includes package records and/or service records that are formatted as illustrated in FIGS. 3-7. If there is no content or service to be automatically subscribed, then the method ends at block 1018. If there is content or services to be automatically subscribed, then the method proceeds to block 1010.

At block 1010, an automatic subscription request is generated. For example, in one embodiment, the subscription manager operates to generate an automatic subscription request that includes information, such a device identifier, a user identifier, device configuration information, content identifiers, service identifiers, and/or any other type of information suitable for use in an automatic subscription request to automatically subscribed to selected content. In another embodiment, the automatic subscription request operates to unsubscribe the device from selected content. For example, the processing logic 902 executes the subscription manager, which in turn, generates the automatic subscription request to subscribe or unsubscribe content to/from the device.

At block 1012, the automatic subscription request is transmitted to a content server. For example, the processing logic 902 controls the transceiver logic 908 to transmit the automatic subscription request to the content server in a transmission that is transparent to the device user. In one embodiment, the transmit channel 914 is used to provide a transparent transmission so that the device user may not be aware that the transmission has occurred.

At block 1014, auto-subscription content and/or services are received from a content server. For example, the server processes the subscription request and determines the auto-subscription content to transmit to the device 900. In one embodiment, the server authorizes a third party to provide the content. The content and/or services may also be provided by a device affiliate.

At block 1016, the auto-subscription content is rendered, or auto-subscription service is performed on the device. For example, the processing logic 902 renders the content on the device 900 using the device resources and interfaces 906.

Thus, the method 1000 operates to allow a device to automatically subscribe to content in a data network. It should be noted that the method 1000 illustrates just one embodiment and that changes, additions, or rearrangements of the functional elements may be made without deviating from the scope of the described embodiments.

Accordingly, while one or more embodiments of an automatic subscription system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

What is claimed is:

1. A method for operating a server in an automatic subscription system for delivery of selected media content associated with an affiliate to a wireless device over an existing wireless communication link, the method comprising:
    receiving authentication and authorization information from the wireless device over the existing wireless communication link to activate the wireless device with the automatic subscription system for delivery of the selected media content;
    activating the wireless device with the automatic subscription system based upon the received authentication and authorization information;
    downloading a subscription manager application to the wireless device over the existing wireless communication link in response to activating the wireless device;
    determining the affiliate associated with the wireless device from a plurality of affiliates based on the authentication and authorization information received from the wireless device, wherein the determined affiliate is not a provider of the existing wireless communication link;
    identifying an auto-subscribe package comprising the selected media content associated with the affiliate for automatic subscription by the wireless device;
    generating system information parameters configured to cause the subscription manager application downloaded to the wireless device to automatically determine that the auto-subscribe package comprising the selected media content needs to be automatically subscribed by the wireless device;
    transmitting the system information parameters to the wireless device over the existing wireless communication link;
    receiving a subscription request for the auto-subscribe package from the subscription manager application downloaded to the wireless device in response to the transmitted system information parameters; and
    subscribing the wireless device to receive the auto-subscribe package.

2. The method of claim 1, wherein said generating comprises generating a package record as part of the system information parameters, wherein the package record indicates that the package is to be automatically subscribed to the wireless device.

3. The method of claim 1, wherein receiving the subscription request comprises receiving the subscription request from the subscription manager application on the wireless device over the existing wireless communication link.

4. The method of claim 1, wherein the affiliate comprises one of a billing and customer service provider, content retailer, content provider, and service provider.

5. The method of claim 1, further comprising:
    transmitting the auto-subscribe package to the wireless device over the existing wireless communication link.

6. The method of claim 1, wherein said generating comprising:
    determining that the auto-subscribe package is to be excluded from the wireless device; and
    generating system information parameters that exclude the auto-subscribe package from being automatically subscribed to by the wireless device.

7. An apparatus for providing automatic subscriptions for delivery of selected media content associated with an affiliate to a wireless device over an existing wireless communication link, comprising:
    a processor configured with software instructions to perform operations comprising:
    receiving authentication and authorization information from the wireless device over the existing wireless communication link to activate the wireless device with the apparatus for providing automatic subscriptions for delivery of the selected media content;
    activating the wireless device with the apparatus for providing automatic subscriptions based upon the received authentication and authorization information;
    downloading a subscription manager application to the wireless device over the existing wireless communication link in response activating the wireless device;
    determining the affiliate associated with the wireless device from a plurality of affiliates based on the authentication and authorization information received from the wireless device, wherein the determined affiliate is not a provider of the existing wireless communication link;
    identifying an auto-subscribe package comprising the selected content associated with the affiliate for automatic subscription by the wireless device;
    generating system information parameters configured to cause the subscription manager application downloaded to the wireless device to automatically determine that auto-subscribe package comprising the selected content needs to be automatically subscribed by the wireless device;
    transmitting the system information parameters to the wireless device over the existing wireless communication link;
    receiving a subscription request for the auto-subscribe package from the subscription manager application downloaded to the wireless device in response to the transmitted system information parameters; and
    subscribing the wireless device to receive the auto-subscribe package.

8. The apparatus of claim 7, wherein the processor is further configured with software instructions to perform operations comprising:
    generating a package record as part of the system information parameters, wherein the package record indicates that the auto-subscribe package is to be automatically subscribed to the wireless device.

9. The apparatus of claim 7, wherein the processor is further configured with software instructions to perform operations comprising:
    receiving the subscription request from the wireless device over the existing wireless communication link.

10. The apparatus of claim 7, wherein the affiliate comprises one of a billing and customer service provider, content retailer, content provider, and service provider.

11. The apparatus of claim 7, wherein the processor is further configured with software instructions to perform operations comprising:
    receiving the auto-subscribe package; and
    transmitting the auto-subscribe package to the wireless device over the existing wireless communication link.

12. The apparatus of claim 7, wherein the processor is further configured with software instructions to perform operations comprising:
  determining that the auto-subscribe package is to be excluded from the wireless device; and
  generating system information parameters that exclude the auto-subscribe package from being automatically subscribed to by the wireless device.

13. An apparatus for providing automatic subscriptions for delivery of selected media content associated with an affiliate to a wireless device over an existing wireless communication link comprising:
  means for receiving authentication and authorization information from the wireless device over the wireless communication link to activate the wireless device with the apparatus for providing automatic subscriptions for delivery of the selected media content;
  means for activating the wireless device with the apparatus for providing automatic subscriptions based upon the received authentication and authorization information;
  means for downloading a subscription manager application to the wireless device over the wireless communication link in response to activating the wireless device;
  means for determining the affiliate associated with the wireless device from a plurality of affiliates based on the authentication and authorization information received from the wireless device, wherein the determined affiliate is not a provider of the existing wireless communication link;
  means for identifying an auto-subscribe package comprising the selected media content associated with the affiliate for automatic subscription by the wireless device;
  means for generating system information parameters configured to cause the subscription manager application downloaded to the wireless device to automatically determine that the auto-subscribe package comprising the selected media content needs to be automatically subscribed by the wireless device;
  means for transmitting the system information parameters to the wireless device over the existing wireless communication link;
  means for receiving a subscription request for the auto-subscribe package from the subscription manager application downloaded to the wireless device in response to the transmitted system information parameters; and
  means for subscribing the wireless device to receive the auto-subscribe package.

14. The apparatus of claim 13, wherein the means for generating comprises means for generating a package record as part of the system information parameters, wherein the package record indicates that the auto-subscribe package is to be automatically subscribed to the wireless device.

15. The apparatus of claim 13, wherein the means for receiving a subscription request further comprises means for receiving the subscription request from the wireless device over the existing wireless communication link.

16. The apparatus of claim 13, wherein the affiliate comprises one of a billing and customer service provider, content retailer, content provider, and service provider.

17. The apparatus of claim 13, further comprising:
  means for transmitting the auto-subscribe package to the wireless device over the existing wireless communication link.

18. The apparatus of claim 13, wherein the means for generating comprise:
  means for determining that the auto-subscribe package is to be excluded from the wireless device; and
  means for generating system information parameters that exclude the auto-subscribe package from being automatically subscribed to by the wireless device.

19. A non-transitory computer-readable medium having stored thereon processor-executable instructions configured to cause a processor to perform operations for auto-subscription of selected media content associated with an affiliate to a wireless device over an existing wireless communication link comprising:
  receiving authentication and authorization information from the wireless device over the wireless communication link to activate the wireless device with an automatic subscription system for delivery of the selected media content;
  activating the wireless device with the automatic subscription system based upon the received authentication and authorization information;
  downloading a subscription manager application to the wireless device over the wireless communication link in response activating the wireless device;
  determining the affiliate associated with the wireless device from a plurality of affiliates based on the authentication and authorization information received from the wireless device, wherein the determined affiliate is not a provider of the existing wireless communication link;
  identifying an auto-subscribe package comprising the selected media content associated with the affiliate for automatic subscription by the wireless device;
  generating system information parameters configured to cause the subscription manager application downloaded to the wireless device to automatically determine that the auto-subscribe package comprising the selected media content needs to be automatically subscribed by the wireless device;
  transmitting the system information parameters to the wireless device over the existing wireless communication link;
  receiving a subscription request for the auto-subscribe package from the subscription manager application downloaded to the wireless device in response to the transmitted system information parameters; and
  subscribing the wireless device to receive the auto-subscribe package.

20. The non-transitory computer-readable medium of claim 19, wherein the stored processor-executable instructions are configured to cause the processor to perform operations such that generating system information parameters comprises generating a package record as part of the system information parameters, wherein the package record indicates that the auto-subscribe package is to be automatically subscribed to the wireless device.

21. The non-transitory computer-readable medium of claim 19, wherein the stored processor-executable instructions are configured to cause the processor to perform operations such that receiving a subscription request comprises receiving the subscription request from the wireless device over the existing wireless communication link.

22. The non-transitory computer-readable medium of claim 19, wherein the affiliate comprises one of a billing and customer service provider, content retailer, content provider, and service provider.

23. The non-transitory computer-readable medium of claim 19, wherein the stored processor-executable instructions are configured to cause the processor to perform operations further comprising:
  transmitting the auto-subscribe package to the wireless device over the existing wireless communication link.

24. The non-transitory computer-readable medium of claim 19, wherein the stored processor-executable instructions are configured to cause the processor to perform operations further comprising:

determining that the auto-subscribe package is to be excluded from the wireless device; and     generating system information parameters that exclude the auto-subscribe package from being automatically subscribed to by the wireless device.

25. A method for operating a wireless device associated with an affiliate in an automatic subscription system for receipt of selected media content associated with the affiliate over an existing wireless communication link, the method comprising:

transmitting authentication and authorization information to a server over the existing wireless communication link to activate the wireless device with the automatic subscription system for delivery of the selected media content, wherein the authentication and authorization information enables the server to determine the affiliate associated with the wireless device from a plurality of affiliates, wherein the determined affiliate is not a provider of the existing wireless communication link;

receiving confirmation of activation of the wireless device with the automatic subscription system based upon the transmitted authentication and authorization information;

receiving a subscription manager application over the existing wireless communication link in response to the activation;

receiving system information parameters configured to identify an auto-subscribe package to be automatically subscribed to the wireless device, wherein the auto-subscribe package comprises selected media content associated with the affiliate;

processing the system information parameters to generate an automatic subscription request to subscribe the auto-subscribe package to the wireless device based on an automatic determination by the subscription manager application executing on the wireless device that the system information parameters indicate the auto-subscribe package needs to be automatically subscribed; and     transmitting the automatic subscription request for the auto-subscribe package to the server to subscribe the wireless device in response to the received system information parameters.

26. The method of claim 25, further comprising executing the subscription manager to process the system information to generate the automatic subscription request.

27. The method of claim 25, further comprising receiving selected media content associated with the auto-subscribe package over the existing wireless communication link.

28. A wireless device associated with an affiliate and configured to operate in an automatic subscription system for receipt of selected media content associated with the affiliate over an existing wireless communication link, comprising:

a processor configured with software instructions to perform operations comprising:

transmitting authentication and authorization information to a server over the wireless communication link to activate the wireless device with the automatic subscription system for delivery of the selected media content, wherein the authentication and authorization information enables the server to determine the affiliate associated with the wireless device from a plurality of affiliates, wherein the determined affiliate is not a provider of the existing wireless communication link;

receiving confirmation of activation of the wireless device with the automatic subscription system based upon the transmitted authentication and authorization information;

receiving a subscription manager application over the existing wireless communication link in response to the activation;

receiving system information parameters configured to identify an auto-subscribe package to be automatically subscribed to the wireless device, wherein the auto-subscribe package comprises selected media content associated with the affiliate;

processing the system information parameters to generate an automatic subscription request to subscribe the auto-subscribe package to the wireless device based on an automatic determination by the subscription manager application executing on the wireless device that the system information parameters indicate the auto-subscribe package needs to be automatically subscribed; and         transmitting the automatic subscription request for the auto-subscribe package to the server to subscribe the wireless device in response to the received system information parameters.

29. The device of claim 28, wherein the processor is further configured with software instructions to perform operations comprising:

executing the subscription manager to process the system information to generate the automatic subscription request.

30. The device of claim 28, wherein the processor is further configured with software instructions to perform operations comprising:

receiving content associated with the auto-subscribe package over the existing wireless communication link.

31. A wireless device associated with an affiliate and configured to operate in an automatic subscription system for receipt of selected media content associated with the affiliate over an existing wireless communication link, comprising:

means for transmitting authentication and authorization information to a server over the existing wireless communication link to activate the wireless device with the automatic subscription system for delivery of the selected media content, wherein the authentication and authorization information enables the server to determine the affiliate associated with the wireless device from a plurality of affiliates, wherein the determined affiliate is not a provider of the existing wireless communication link;

means for receiving confirmation of activation of the wireless device with the automatic subscription system based upon the transmitted authentication and authorization information;

means for receiving a subscription manager application over the existing wireless communication link in response to the activation;

means for receiving system information parameters configured to identify an auto-subscribe package to be automatically subscribed to the wireless device, wherein the auto-subscribe package comprises selected media content associated with the affiliate;

means for processing the system information parameters to generate an automatic subscription request to subscribe the auto-subscribe package to the wireless device based on an automatic determination by the subscription manager application executing on the wireless device that the system information parameters indicate the auto-subscribe package needs to be automatically subscribed; and means for transmitting the automatic subscription request for the auto-subscribe package to the server to subscribe the wireless device in response to the received system information parameters.

32. The apparatus of claim 31, further comprising means for executing the subscription manager application to process the system information to generate the automatic subscription request.

33. The apparatus of claim 31, further comprising means for receiving content associated with the auto-subscribe package over the existing wireless communication link.

34. A non-transitory computer-readable medium having stored thereon processor-executable instructions configured to cause a processor of a wireless device to perform operations for receipt of selected media content associated with an affiliate over an existing wireless communication link comprising:

transmitting authentication and authorization information to a server over the existing wireless communication link to activate the wireless device with the automatic subscription system for delivery of the selected media content, wherein the authentication and authorization information enables the server to determine the affiliate associated with the wireless device from a plurality of affiliates, wherein the determined affiliate is not a provider of the existing wireless communication link;

receiving confirmation of activation of the wireless device with the automatic subscription system based upon the transmitted authentication and authorization information;

receiving a subscription manager application over the existing wireless communication link in response to the activation;

receiving system information parameters configured to identify an auto-subscribe package to be automatically subscribed to the wireless device, wherein the auto-subscribe package comprises selected media content associated with the affiliate;

processing the system information parameters to generate an automatic subscription request to subscribe the auto-subscribe package to the wireless device based on an automatic determination by the subscription manager application executing on the wireless device that the system information parameters indicate the auto-subscribe package needs to be automatically subscribed; and transmitting the automatic subscription request for the auto-subscribe package to the server to subscribe the wireless device in response to the received system information parameters.

35. The non-transitory computer-readable medium of claim 34, wherein the stored processor-executable instructions are configured to cause the processor to perform operations further comprising:

executing the subscription manager to process the system information to generate the automatic subscription request.

36. The non-transitory computer-readable medium of claim 34, wherein the stored processor-executable instructions are configured to cause the processor to perform operations further comprising:

receiving content associated with the auto-subscribe package over the existing wireless communication link.

* * * * *